No. 775,591. PATENTED NOV. 22, 1904.
E. L. AIKEN.
REPEATING ATTACHMENT FOR PHONOGRAPHS.
APPLICATION FILED JUNE 28, 1904.
NO MODEL.
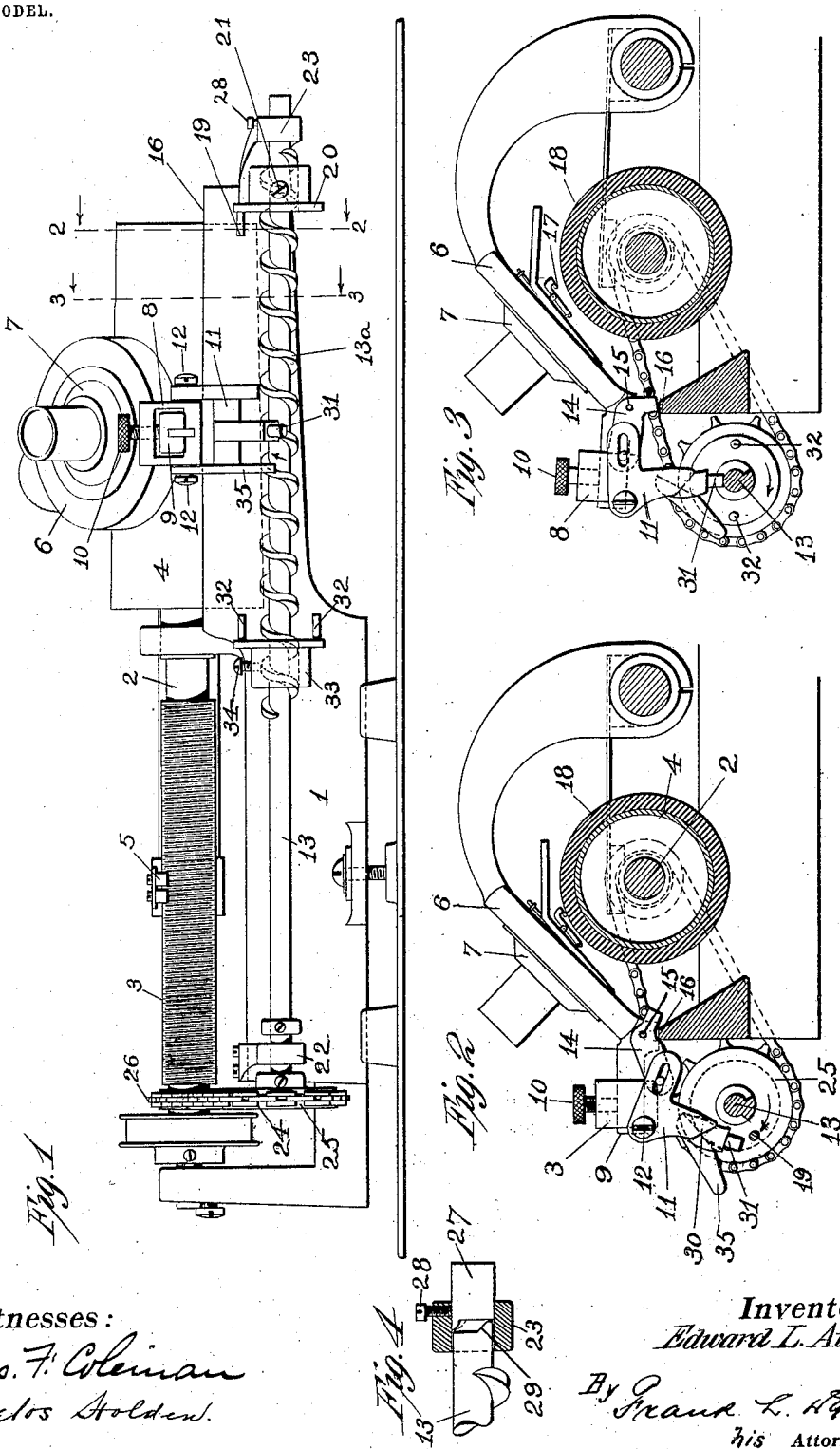
Witnesses:
Jas. F. Coleman
Delos Holden.
Inventor
Edward L. Aiken
By Frank L. Dyer
his Attorney.

No. 775,591.

Patented November 22, 1904.

UNITED STATES PATENT OFFICE.

EDWARD L. AIKEN, OF EAST ORANGE, NEW JERSEY, ASSIGNOR TO NEW JERSEY PATENT COMPANY, OF ORANGE, NEW JERSEY, A CORPORATION OF NEW JERSEY.

REPEATING ATTACHMENT FOR PHONOGRAPHS.

SPECIFICATION forming part of Letters Patent No. 775,591, dated November 22, 1904.

Application filed June 28, 1904. Serial No. 214,465. (No model.)

*To all whom it may concern:*

Be it known that I, EDWARD L. AIKEN, a citizen of the United States, residing at East Orange, county of Essex, and State of New Jersey, have invented certain new and useful Improvements in Repeating Attachments for Phonographs, of which the following is a description.

My invention has for its object the provision of means for raising the diaphragm-carrier of a phonograph or other talking-machine at any desired point in its forward movement and returning it to its starting position at the beginning of the record or to any other desired starting position. It has for its object also to provide a device of this character which shall consist of few parts, which may be readily applied to phonographs of standard types, which can be operated with little power, which can be readily adjusted, which will be positive and certain in its action, which will not become deranged, and which will permit the diaphragm-carrier to be raised to the fullest extent, so as to leave the mandrel completely exposed to receive a record-cylinder or permit one to be removed therefrom.

My invention consists in the features hereinafter described and claimed.

In the drawings which accompany this specification, Figure 1 is a front elevation showing my invention as applied to a phonograph. Fig. 2 is a section on the line 2 2 of Fig. 1, showing the diaphragm-carrier lowered and in proper position for reproducing, the pins which are used for tripping the device to lower the carrier being removed for the sake of clearness. Fig. 3 is a section on the line 3 3 of Fig. 1, showing the diaphragm-carrier elevated and in proper position for its return movement. Fig. 4 is a sectional detail view of one end of the return-screw shaft and bearing.

In the several views corresponding parts are indicated by the same reference-numerals.

The drawings illustrate one embodiment of my invention applied to a phonograph of ordinary construction, the latter including a frame 1, main shaft 2, feed-screw 3, mandrel 4, feed-nut 5, diaphragm-carrier 6, and reproducer 7 of the usual construction. My attachment, as shown, comprises a sleeve 8, removably secured to the projecting arm 9 of the diaphragm-carrier 6 by means of a set-screw 10. A dog 11 is pivoted to the sleeve 8 by pivots 12, whose axis is parallel to the return-screw shaft 13. This dog is connected to a lift-lever 14 by a pin-and-slot connection, as shown in Figs. 2 and 3, whereby a movement of the dog upon its pivot 12 causes the lift-lever to move upon its pivot 15. The lift-lever by coöperating with the straight edge 16 raises the diaphragm-carrier and holds it in an elevated position while it is being returned to its starting-point, thereby holding the feed-nut out of engagement with the feed-screw and the reproducing-stylus 17 out of engagement with the record 18.

The means for turning the lifting-dog 11, and thereby lifting the diaphragm-carrier, consists of a pin 19, carried by a disk 20. This disk rotates continuously during the operation of the phonograph, being preferably sleeved upon the return-screw shaft 13 and secured thereto in any suitable manner, as by a set-screw 21. It is obvious, however, that the said disk may be sleeved upon and driven by an auxiliary shaft, if desired.

The return-screw shaft 13 is journaled in bearings 22 and 23, secured to the frame 1 in any suitable manner and is driven from the shaft 2 in any suitable manner, as by the chain 24, passing over the sprockets 25 and 26. In the bearing 23 (see Fig. 4) is secured a stationary cam 27, held by a set-screw 28. The end of the screw-shaft 13 is provided with a cam 29, which coöperates with the cam 27 in a manner to be now explained.

The forward movement of the diaphragm-carrier along the record causes the dog 11 to approach the rotating pin 19 until it comes in contact therewith, at which time the pin tends to turn or raise the dog and at the same time tends to push it and the carrier in a backward direction—that is, the pin does not exert a direct lift on account of the shapes and relative positions of the various parts. The forward movement of the carrier is so slow that this engagement of the pin with the dog is very slight, and in the absence of the cams 27 and 29 the pin would raise the diaphragm-carrier until the feed-nut was disengaged from the feed-screw, whereupon the carrier would slide back and fall, to be picked up on the next revolution of the pin with the same result, and so on. To obviate this difficulty, I provide means whereby the shaft 13 and pin 19 may yield longitudinally and allow the carrier to advance until the dog 11 will be engaged by the pin 19 with sufficient bearing-surface to raise it from the position shown in Fig. 2 to that of Fig. 3. The cam 27 is set in such a position that the shaft 13 and pin 19 will be thrown farthest toward the left shortly before the pin reaches the shoulder 30 of the dog 11, and the cams will not prevent the shaft from being moved longitudinally by the dog. The pin 19 will by reason of the cams 27 and 29 be carried once in each revolution to a fixed position with respect to the frame of the machine. Whenever the pin passes the dog without turning it, the dog will be carried farther to the right by the feed-screw until the dog reaches a position where the throw of the cams 27 and 29 will cause the pin to be carried against it with sufficient bearing-surface to raise the diaphragm-carrier from the position of Fig. 2 to that of Fig. 3. In practice I have found that when the weight of the diaphragm-carrier is slight—that is, when it is not carrying a horn—the pin 19 will strike against the dog 11 once or twice before it engages it sufficiently to raise the carrier, and when the carrier is weighted with the horn the pin will strike against the dog about three times, at the end of which time the carrier has traveled far enough to the right to insure a good grip of the pin upon the shoulder 30 at the succeeding revolution.

When the dog is raised into the position shown in Fig. 3, a depending pin 31, carried by the dog, is brought into engagement with the screw-shaft 13, preferably the upper surface thereof. The screw 13ª, being of coarse pitch, rapidly returns the diaphragm-carrier to its starting position. When this is reached, the carrier is lowered by means of a rotating pin or preferably by one of a pair of rotating pins 32 32, which may be driven continuously by the screw-shaft 13, as shown, or by an auxiliary shaft. The sleeve 33, which carries the said pins, is longitudinally adjustable upon the shaft 13 and may be secured thereto by a set-screw 34. The dog 11 carries a depending trip-arm 35, and as the carrier moves rearward the said trip-arm is carried into the path of the pins 32, one of which strikes the said arm and turns the dog from the position of Fig. 3 to that of Fig. 2, thereby disengaging the pin 31 from the screw 13ª, turning the lift-lever 14 and lowering the diaphragm-carrier so that the feed-nut will be in engagement with the feed-screw and the reproducer-stylus 17 will be in its operative position upon the record, and the operation may proceed as before.

Having thus fully described my invention, what I claim as new, and desire to secure by Letters Patent, is as follows:

1. In a repeating attachment for talking-machines, in combination, a traveling diaphragm-carrier, a straight edge supporting the forward end of said carrier, a lift-lever pivoted to said carrier and coöperating with the straight edge to raise the carrier, a dog pivoted to the carrier and a connection between said dog and lift-lever whereby a pivotal movement of the dog turns said lift-lever and raises the carrier, substantially as set forth.

2. In a repeating attachment for talking-machines, in combination, a traveling diaphragm-carrier, a straight edge supporting the forward end of said carrier, the lift-lever pivoted to said carrier and coöperating with the straight edge to raise the carrier, a return-screw, a dog pivoted to the carrier, having a portion adjacent said screw and adapted to engage the same, and a connection between said dog and lift-lever whereby a pivotal movement of the dog turns the lift-lever and raises the carrier, and finally causes the dog to engage the return-screw, substantially as set forth.

3. In a repeating attachment for talking-machines, in combination, a traveling diaphragm-carrier, a straight edge supporting the forward end of said carrier, a lift-lever pivoted to said carrier and coöperating with the straight edge to raise the carrier, a return-screw, a dog pivoted to the carrier, having a portion adjacent said screw and adapted to engage the same, and a connection between said dog and lift-lever, the parts being so arranged that a pivotal movement of the dog turns the lift-lever and raises the carrier and dog, and finally causes the dog to rest upon and engage the top surface of the return-screw, substantially as set forth.

4. In a repeating attachment for talking-machines, in combination, with the feed-screw, feed-nut and diaphragm-carrier, mechanism for raising the diaphragm-carrier which comprises a rotating shaft, a pin or projection carried thereby, and means whereby the rotation of said shaft causes simultaneous reciprocating and rotary movement of the said pin or projection, substantially as set forth.

5. In a repeating attachment for talking-machines, in combination with the feed-screw, feed-nut and diaphragm-carrier, mechanism for raising the diaphragm-carrier which comprises a rotating shaft, a pin or projection carried thereby, and a cam carried by said shaft whereby the rotation of said shaft causes simultaneous reciprocating and rotary movement of the said shaft and pin, or projection, substantially as set forth.

6. In a repeating attachment for talking-machines, in combination with the feed-screw, feed-nut and diaphragm-carrier, mechanism for raising the diaphragm-carrier, which comprises a rotating shaft, a pin or projection carried thereby and longitudinally adjustable thereon, and means whereby the rotation of said shaft causes simultaneous reciprocating and rotary movement of the said pin or projection, substantially as set forth.

7. In a repeating attachment for talking-machines, in combination, a traveling diaphragm-carrier, a straight edge supporting the forward end of said carrier, a lift-lever pivoted to said carrier and coöperating with the straight edge to raise the carrier, a dog pivoted to the carrier and a connection between said dog and lift-lever whereby a pivotal movement of the dog turns said lift-lever and raises the carrier, and a trip mechanism for restoring said dog to its original position and thereby lowering said carrier, substantially as set forth.

8. In a repeating attachment for talking-machines, in combination, a traveling diaphragm-carrier, a straight edge supporting the forward end of said carrier, a lift-lever pivoted to said carrier and coöperating with the straight edge to raise the carrier, a dog pivoted to the carrier and a connection between said dog and lift-lever whereby a pivotal movement of the dog turns said lift-lever and raises the carrier, and adjustable trip mechanism for restoring said dog to its original position and thereby lowering said carrier, substantially as set forth.

This specification signed and witnessed this 27th day of June, 1904.

EDWARD L. AIKEN.

Witnesses:
FRANK L. DYER,
DELOS HOLDEN.